(12) United States Patent
Wei

(10) Patent No.: US 10,274,127 B2
(45) Date of Patent: Apr. 30, 2019

(54) WATERPROOF STABILIZER

(71) Applicant: Chengyun Wei, Guangxi (CN)

(72) Inventor: Chengyun Wei, Guangxi (CN)

( * ) Notice: Subject to any disclaimer, the term of this patent is extended or adjusted under 35 U.S.C. 154(b) by 93 days.

(21) Appl. No.: 15/627,468

(22) Filed: Jun. 20, 2017

(65) Prior Publication Data

US 2018/0283601 A1 Oct. 4, 2018

(30) Foreign Application Priority Data

Mar. 28, 2017 (CN) .......................... 2017 1 0191104

(51) Int. Cl.
| | | |
|---|---|---|
| *F16M 11/18* | (2006.01) | |
| *F16M 11/10* | (2006.01) | |
| *F16M 11/20* | (2006.01) | |
| *F16M 13/00* | (2006.01) | |
| *F16M 13/02* | (2006.01) | |
| *G03B 17/56* | (2006.01) | |
| *F16M 11/04* | (2006.01) | |
| *F16M 11/12* | (2006.01) | |
| *H04N 5/225* | (2006.01) | |

(52) U.S. Cl.
CPC ............. *F16M 11/18* (2013.01); *F16M 11/04* (2013.01); *F16M 11/041* (2013.01); *F16M 11/10* (2013.01); *F16M 11/121* (2013.01); *F16M 11/2071* (2013.01); *F16M 13/00* (2013.01); *F16M 13/02* (2013.01); *F16M 13/022* (2013.01); *G03B 17/56* (2013.01); *G03B 17/561* (2013.01); *H04N 5/2253* (2013.01); *F16M 2200/024* (2013.01); *F16M 2200/041* (2013.01); *F16M 2200/044* (2013.01)

(58) Field of Classification Search
CPC .... F16M 11/18; F16M 11/121; F16M 11/041; G03B 17/561; G03B 17/08
See application file for complete search history.

(56) References Cited

U.S. PATENT DOCUMENTS

| | | | |
|---|---|---|---|
| 6,965,411 B1* | 11/2005 | Jones ................... | F16M 11/105 144/382 |
| 2016/0016674 A1* | 1/2016 | Zhao ...................... | B64D 47/08 244/118.1 |
| 2016/0083110 A1* | 3/2016 | Pan ....................... | G03B 17/561 348/144 |
| 2017/0064176 A1* | 3/2017 | Kim ....................... | F16M 11/18 |
| 2017/0146893 A1* | 5/2017 | Tang .................... | F16M 11/121 |
| 2017/0192341 A1* | 7/2017 | Casarez ............... | G03B 17/561 |

(Continued)

*Primary Examiner* — Eret C McNichols

(57) ABSTRACT

The present invention relates to the field of photographing equipments and discloses a waterproof stabilizer. The waterproof stabilizer has a fastening assembly, a rotary assembly and a waterproof assembly. The rotary assembly has a first motor, a second motor and a third motor, a first connecting arm piece and a second connecting arm piece. The first motor, the second motor and the third motor are spatially distributed orthogonally. The waterproof assembly has a first seal ring, a second seal ring, a third seal ring, a fourth seal ring, a first waterproof plug, a second waterproof plug and a third waterproof plug. Multiple said seal rings and said waterproof plug are respectively arranged between structural parts or between connecting parts to reinforce the sealability of the waterproof stabilizer, which enables the waterproof stabilizer to be waterproof and functionally applicable in dampness or when contacting water.

11 Claims, 4 Drawing Sheets

(56) References Cited

U.S. PATENT DOCUMENTS

| | | | |
|---|---|---|---|
| 2017/0227162 A1* | 8/2017 | Saika | F16M 13/02 |
| 2017/0254469 A1* | 9/2017 | Okamura | F16M 11/126 |
| 2018/0106422 A1* | 4/2018 | Saika | H04N 5/2328 |
| 2018/0149949 A1* | 5/2018 | Kim | F16M 11/06 |

* cited by examiner

WATERPROOF STABILIZER

CROSS-REFERENCE TO RELATED APPLICATIONS

The present application claims the benefit of Chinese Patent Application No. 201710191104.9 filed on Mar. 28, 2017, the contents of which are hereby incorporated by reference.

FIELD OF THE INVENTION

The present invention relates to a stabilizer and is more particularly concerned with a waterproof stabilizer.

BACKGROUND OF THE INVENTION

Stabilizers are used in stabilizing an object, adjusting the position of an object (such as direction, roll and pitch angle) and securing an object in the right position so as to enable the object to provide a steady, smooth and multi-angled shoot. Such object includes camcorders and cameras etc. So far, most stabilizers are hand-held or use a pan tilt system. Sports enthusiasts normally fix a stabilizer on bicycles, helmets or their wrists etc. to assist their cameras in photographing. However, under current technology, damage may easily be done while stabilizers meet dampness or water since stabilizers are not made waterproof, which imposes restriction on the use of such stabilizers and gives rise to inconvenience.

SUMMARY OF THE INVENTION

The present invention aims at providing a waterproof stabilizer to resolve the issue of stabilizers getting damaged when contacting water and enable the use of which with its suited camera under certain particular circumstances like in damp environment or water contacting environment.

For the realization of the above-mentioned aim, the present invention provides a waterproof stabilizer, which comprises a fastening assembly, a rotary assembly and a waterproof assembly. The rotary assembly comprises a first motor, a second motor, a third motor, a first connecting arm piece and a second connecting arm piece. The first motor, the second motor and the third motor are spatially distributed orthogonally. A rotor of the first motor is connected to the fastening assembly; a stator of the first motor is fixedly connected to a rotor of the second motor via the first connecting arm piece; a stator of the second motor is fixedly connected to a rotor of the third motor via the second connecting arm piece.

A first protective case and a first protective cover are arranged outside of the first motor. A side wall of the first protective case is connected to the first connecting arm piece. The first protective cover covers the first protective case. Likewise, a second protective case and a second protective cover are arranged outside of the second motor. A side wall of the second protective case is connected to the second connecting arm piece. The second protective cover covers the second protective case.

The waterproof assembly comprises a first seal ring, a second seal ring, a third seal ring, a fourth seal ring, a first waterproof plug, a second waterproof plug and a third waterproof plug.

The first seal ring is arranged between the fastening assembly and the rotor of the first motor.

The second seal ring is arranged between the first protective case and the first protective cover.

The third seal ring sheathes a shaft of the second motor.

The fourth seal ring is arranged between the second protective case and the second protective cover.

The first waterproof plug is located between the side wall of the first protective case and the first connecting arm piece.

The second waterproof plug is located between the side wall of the second protective case and the second connecting arm piece.

The third waterproof plug is disposed at one end of a shaft of the third motor and plugs a shaft socket of the third motor.

Preferably, the waterproof stabilizer further comprises a base and a stator of the third motor is attached on a top surface of the base. The base comprises an outer case and a lid. The lid covers the outer case. An USB port and an indicating light are arranged on a surface of the outer case. The waterproof assembly further comprises a fifth seal ring, a fourth waterproof plug, a waterproof membrane and a waterproof plate. The fifth seal ring is set between the outer case and the lid. The fourth waterproof plug is attached to the surface of the outer case and fully covers the USB port. The waterproof membrane is attached to the surface of the outer case and fully covers the indicating light. The waterproof plate is perfectly attached on a surface of the lid.

Preferably, a slideway is situated at one end of the first connecting arm piece that connects to the rotor of the second motor. The rotor of the second motor is provided with a connecting piece, through which the rotor of the second motor slides into the slideway for connection. Further, the connecting piece has a fastening piece for fixing a relative position between the second motor and the first connecting piece.

Preferably, the fastening piece is a screw connector, which sleeves on an outside of the connecting piece.

Preferably, the fastening assembly comprises a fixing plate, a clamping bar and a locking screw. An upper end and a lower end of the fixing plate are arranged with a groove for holding the object. The upper end and the lower end of the fixing plate are also provided with a through hole, corresponding to which a screw hole is respectively located on an upper end and a lower end of the clamping bar. The locking screw threads its way through both the through hole and the screw hole to stabilize the object within the space confined by the fixing plate and the clamping bar.

Preferably, the through hole is provided with a slot for left and right motion of the locking screw.

Preferably, the waterproof assembly is made of soft material.

Preferably, the seal ring is O-shaped.

Preferably, the waterproof membrane is made of transparent material.

Preferably, the base further comprises a control board and a button interface and is provided with a mounting component.

Regarding the waterproof stabilizer disclosed in the present invention, its first motor, second motor and third motor are spatially distributed orthogonally. The rotor of the first motor is connected to the fastening assembly. One end of the first connecting arm piece is connected to the stator of the first motor while the other end of the first connecting arm piece is connected to the rotor of the second motor. One end of the second connecting arm piece is connected to the stator of the second motor while the other end of the second connecting arm piece is connected to the rotor of the third motor. Especially, the outside of the first motor is provided with the first protective case and the first protective cover.

Likewise, a second protective case and a second protective cover are arranged outside of the second motor. The first seal ring is set between the fastening assembly and the rotor of the first motor. The second seal ring is set between the first protective case and the first protective cover. The third seal ring sheathes the shaft of the second motor. The fourth seal ring is arranged between the second protective case and the second protective cover. The first waterproof plug is located between the first protective case and the first connecting arm piece. The second waterproof plug is set between the second protective case and the second connecting arm piece. And the third waterproof plug is arranged at one end of the shaft of the third motor and plugs the shaft socket of the third motor. The waterproof stabilizer of this invention reinforces the sealability of structural parts and connecting parts of the waterproof stabilizer, which enables the waterproof stabilizer to be waterproof and functionally applicable in dampness or when contacting water.

Figure 1:
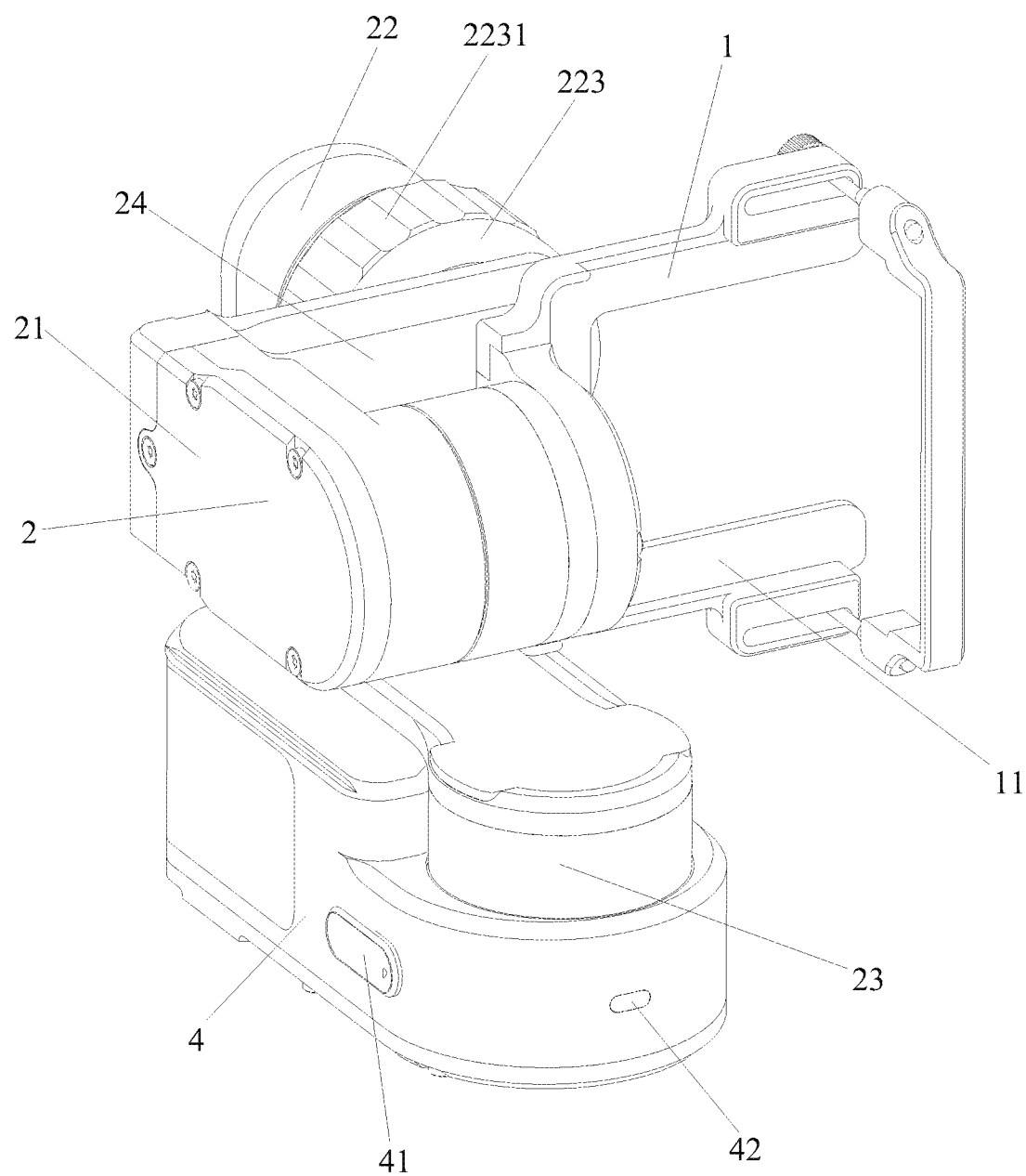
FIG. 1 is a first schematic view of a waterproof stabilizer according to one embodiment of the present invention.

LIST OF REFERENCE NUMERALS 1. fastening assembly
11. fixing plate
111. slot
12. clamping bar
13. locking screw
2. rotary assembly
21. first motor
211. first protective case
212. first protective cover
22. second motor
221. second protective case
222. second protective cover
223. connecting piece
2231. fastening piece
23. third motor
24. first connecting arm piece
25. second connecting arm piece
3. waterproof assembly
31. first seal ring
32. second seal ring
33. third seal ring
34. fourth seal ring
35. fifth seal ring
36. first waterproof plug
37. second waterproof plug
38. third waterproof plug
39. fourth waterproof plug
310. waterproof membrane
311. waterproof plate
4. base
41. USB port
42. indicating light
43. button interface
44. first mounting component
45. second mounting component
46. outer case
47. lid

DETAILED DESCRIPTION OF ILLUSTRATED EMBODIMENTS

Embodiments of the present invention are further explained clearly as follows in conjunction with figures. The following embodiments are considered in all respects as illustrative and not restrictive.

Figure 2:
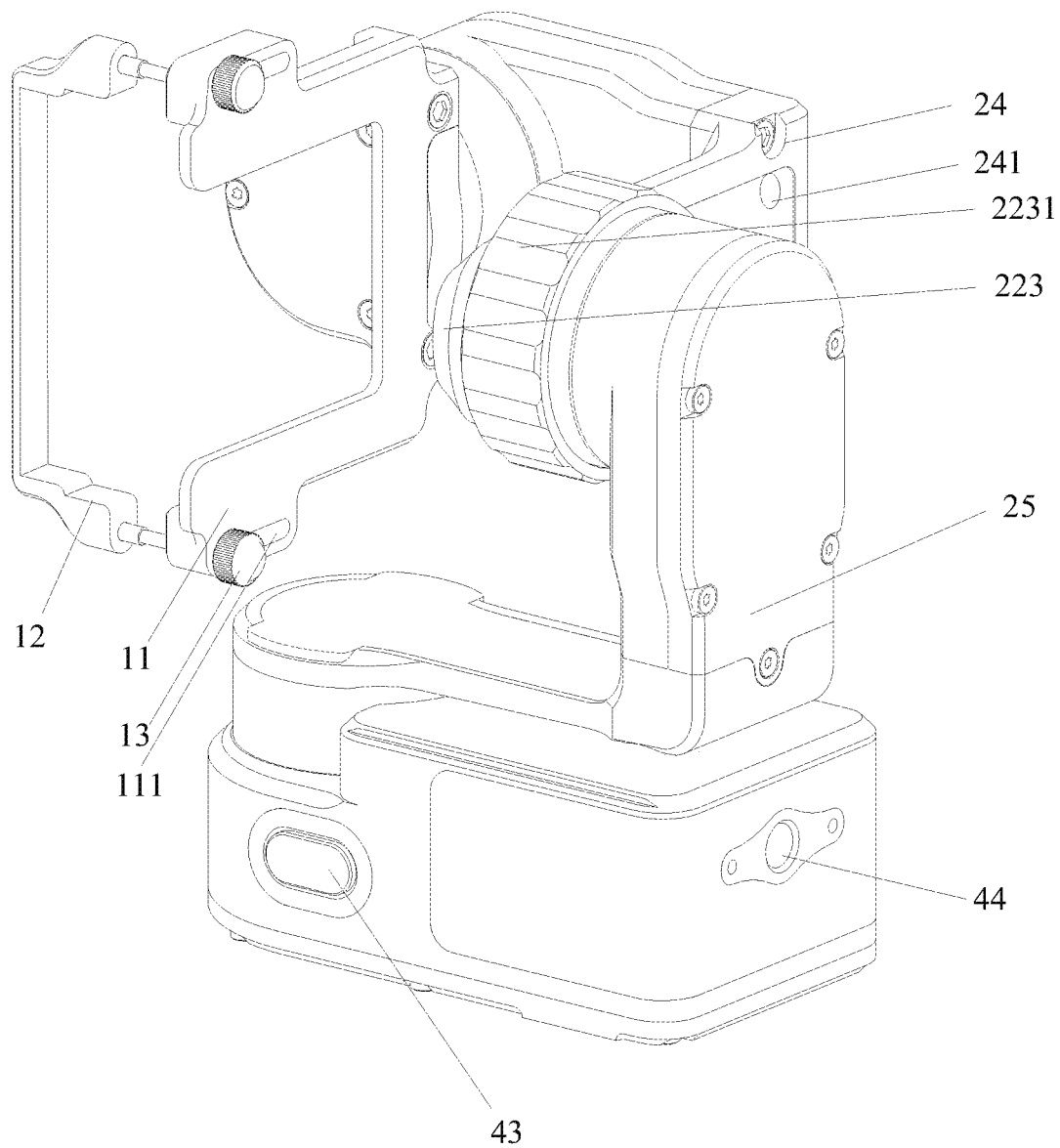
FIG. 2 is a second schematic view the waterproof stabilizer shown in FIG. 1.
Figure 4:
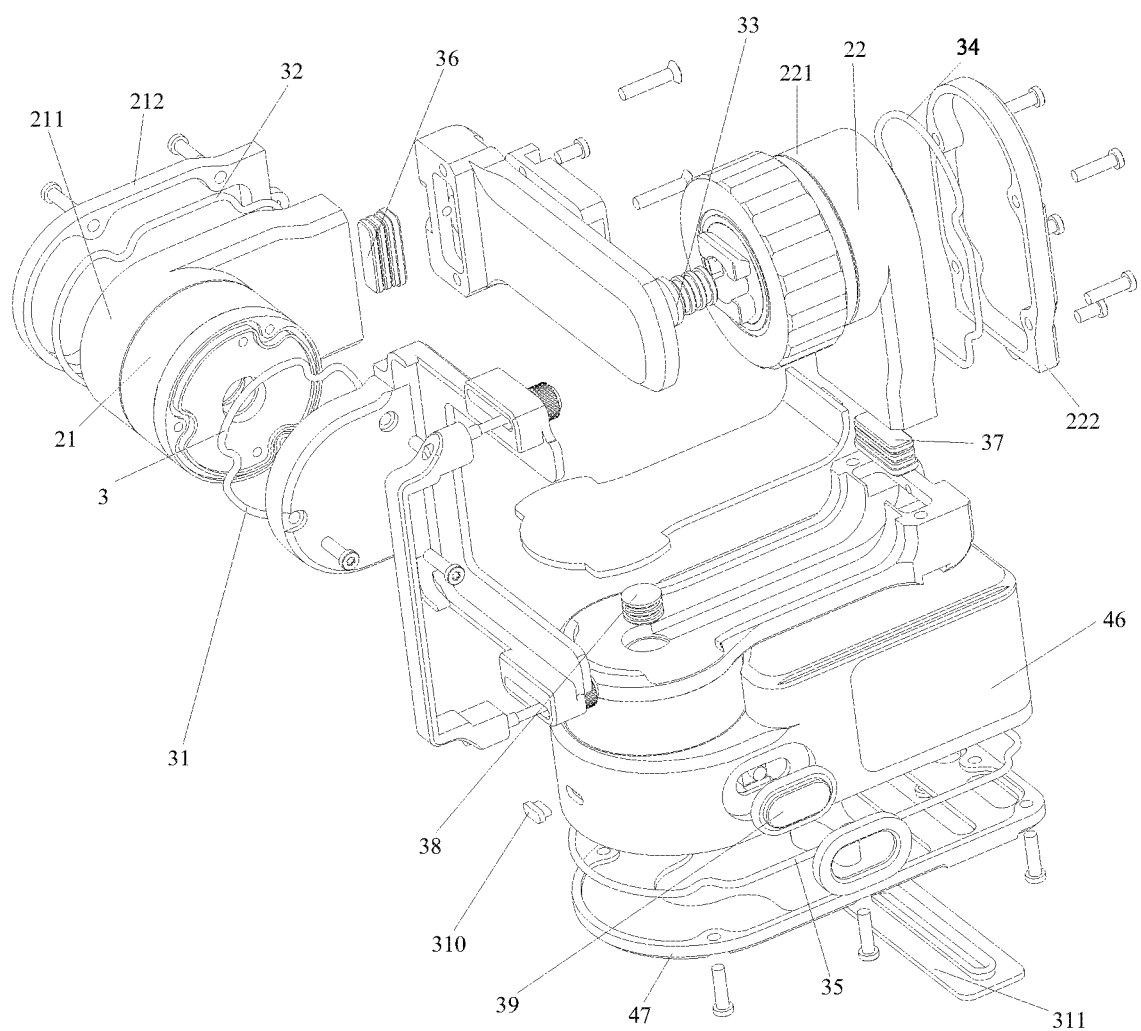
FIG. 4 is an exploded view of the waterproof stabilizer shown in FIG. 1.

As shown in FIGS. 1, 2 and 4, a waterproof stabilizer according to the present invention comprises a fastening assembly 1, a rotary assembly 2 and a waterproof assembly 3. The rotary assembly 2 comprises a first motor 21, a second motor 22, a third motor 23, a first connecting arm piece 24 and a second connecting arm piece 25.

The first motor 21, the second motor 22 and the third motor 23 are spatially distributed orthogonally. A rotor of the first motor 21 is connected to the fastening assembly 1; a stator of the first motor 21 is fixedly connected to a rotor of the second motor 22 via the first connecting arm piece 24; a stator of the second motor 22 is fixedly connected to a rotor of the third motor 23 via the second connecting arm piece 25. When in use, cameras or camcorders are stabilized by the fastening assembly 1. The first motor 21 controls the pitch angle of the fastening assembly 1. The second motor 22 controls the roll angle of the fastening assembly 1. And the third motor 23 controls the pan angle of the fastening assembly 1. A first protective case 211 and a first protective cover 212 are arranged outside of the first motor 21. A side wall of the first protective case 211 is connected to the first connecting arm piece 24. The first protective cover 212 covers the first protective case 211 to protect the first motor 21 and prevent the first motor 21 from damage due to collision, therefore gives the first motor 21 waterproof property. Likewise, a second protective case 221 and a second protective cover 222 are arranged outside of the second motor 22. A side wall of the second protective case 221 is connected to the second connecting arm piece 25. The second protective cover 222 covers the second protective case 221. Furthermore, the first protective case 211 is provided with a first circuit board to control the first motor 21 and the second protective case 221 is provided with a second circuit board to control the second motor 22.

The waterproof assembly 3 comprises a first seal ring 31, a second seal ring 32, a third seal ring 33, a fourth seal ring 34, a first waterproof plug 36, a second waterproof plug 37 and a third waterproof plug 38. The first seal 31 ring is arranged between the fastening assembly 1 and the rotor of the first motor 21. The second seal ring 32 is arranged between the first protective case 211 and the first protective cover 212. The third seal ring 33 sheathes a shaft of the second motor 22. The fourth seal ring 34 is arranged between the second protective case 221 and the second protective cover 222. The first waterproof plug 36 is located between the side wall of the first protective case 211 and the first connecting arm piece 24. The second waterproof plug 37 is located between the side wall of the second protective case 221 and the second connecting arm piece 25. The third waterproof plug 38 is disposed at one end of a shaft of the third motor 23 and plugs a shaft socket of the third motor 23. Such design reinforces the sealability of structural parts and connecting parts of the waterproof stabilizer, which enables the waterproof stabilizer to be waterproof and functionally applicable in dampness or when contacting water.

Figure 3:
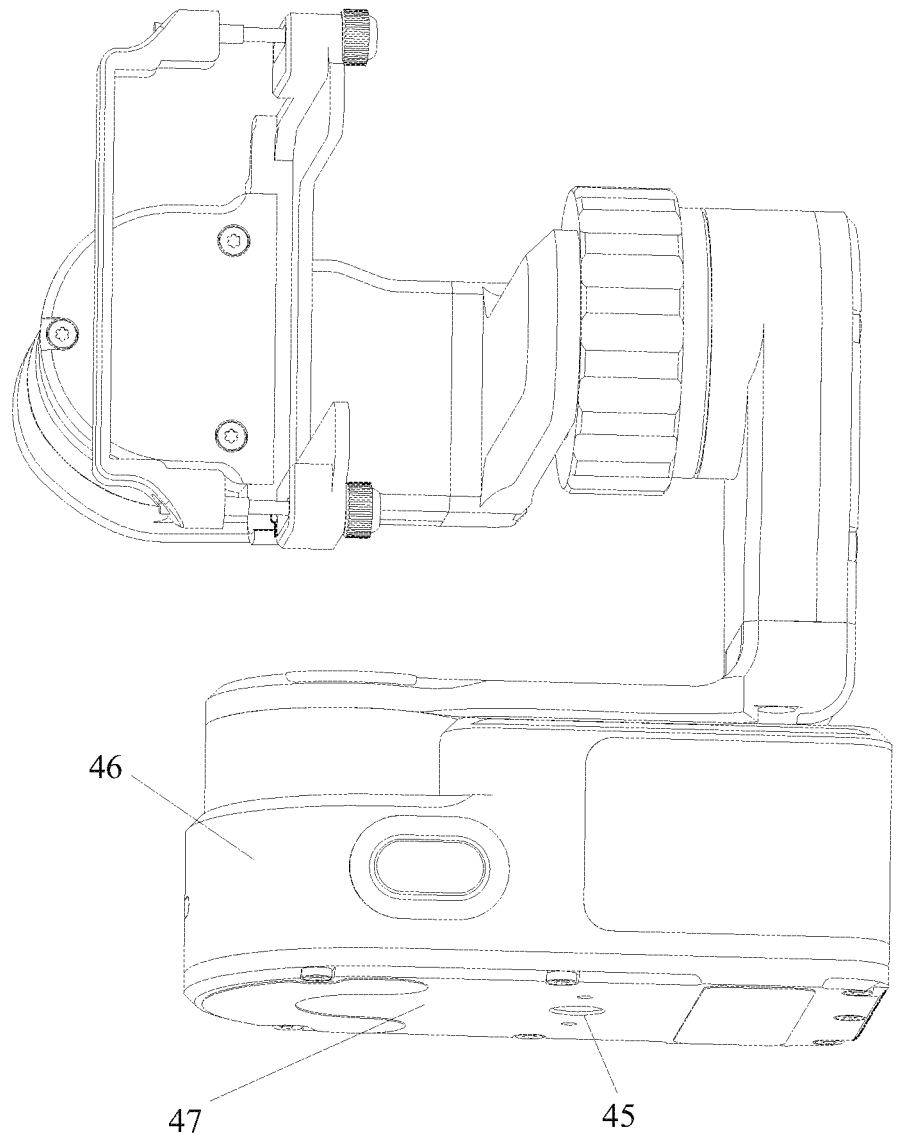
FIG. 3 is a third schematic view of the waterproof stabilizer shown in FIG. 1.

As shown in FIGS. 1, 2 and 3, the waterproof stabilizer further comprises a base 4, a stator of the third motor 23 is attached on a top surface of the base 4. The base 4 comprises an outer case 46 and a lid 47. The lid 47 covers the outer case 46. An USB port 41 and an indicating light 42 are arranged on a surface of the outer case 46. The waterproof assembly 3 further comprises a fifth seal ring 35, a fourth waterproof plug 39, a waterproof membrane 310 and a waterproof plate 311. The fifth seal ring 35 is set between the outer case 46 and the lid 47 to prevent water from getting in the outer case 46 through a gap between the lid 47 and the outer case 46 and causing damage to any parts located in the outer case 46. The fourth waterproof plug 39 is attached to the surface of the outer case 46 and fully covers the USB port 41, which seals the USB port 41 when it is not in use and prevents water from flowing in the USB port 41 causing damage. In addition, the waterproof membrane 310 is attached to the surface of the outer case 46 and fully covers the indicating light 42. The waterproof plate 311 is perfectly attached on a surface of the lid 47 to enhance the water resistance of the waterproof stabilizer. Specifically, Bluetooth is arranged in the base 4, an exterior surface of the lid 47 has an opening corresponding to the location of Bluetooth. The waterproof plate is attached on the opening.

In order to be made compatible with objects in different sizes or weights, the second motor 22 of the waterproof stabilizer is available to be adjusted to reach balance. A slideway 241 is situated at one end of the first connecting arm piece 24 that connects to the rotor of the second motor 22. The rotor of the second motor 22 is provided with a connecting piece 223, through which the rotor of the second motor 22 slides into the slideway 241 for connection, thereby enables the second motor 22 to slide along the first connecting arm piece 24. Further, the connecting piece 223 has a fastening piece 2231 for fixing a relative position between the second motor 22 and the first connecting arm piece 24. Specifically, the fastening piece 2231 is a screw connector, which sleeves on an outside of the connecting piece 223. The position of the second motor 22 is fixed when tightening the screw connector where the second motor 22 is able to move in the slideway 241 when the screw connector is loosened.

For the stabilization of the object on the waterproof stabilizer, the fastening assembly 1 comprises a fixing plate 11, a clamping bar 12 and a locking screw 13. An upper end and a lower end of the fixing plate 11 are arranged with a groove. The upper end and the lower end of the fixing plate 11 are also provided with a through hole, corresponding to which a screw hole is respectively located on an upper end and a lower end of the clamping bar 12. When in use, the grooves hold the camera or camcorder and the locking screw 13 threads its way through both the through hole and the screw hole to stabilize the camera or the camcorder within a space confined by the fixing plate 11 and the clamping bar 12. Additionally, the through hole is provided with a slot 111 for left and right motion of the locking screw 13. Correspondingly, the left and right motion of the clamping bar 12 makes a match between the screw hole and the locking screw 13, therefore adjusts a relative position between the clamping bar 12 and the fixing plate 11 and enables the fastening assembly 1 to be compatible with differently sized cameras.

Preferably, the waterproof assembly 3 is made of soft material. The first seal ring 31, the second seal ring 32, the third seal ring 33, the fourth seal ring 34 and the fifth seal ring 35 are made O-shaped.

The waterproof membrane 310 may be made of transparent material, which reduces the prejudice caused by the waterproof membrane 310 to the brightness of the indicating light 42.

The base 4 may further comprise a control board, and a button interface 43 so that functions could be realized through operating the base 4. The base 4 is provided with a mounting component for mounting the base 4 on any other places. Specifically, a side wall of the base 4 is provided with a first mounting component 44, a second mounting component 45 is arranged on a bottom side of the base 4. Preferably, the first mounting component 44 and the second mounting component 45 are ¼ inch screw holes. A screw hole or a screw that is compatible with the ¼ inch screw hole is needed for mounting or stabilizing the base 4 on which the base 4 is required.

In conclusion, the present invention provides a waterproof stabilizer. Its first motor, second motor and third motor are spatially distributed orthogonally. The rotor of the first motor is connected to the fastening assembly. One end of the first connecting arm piece is connected to the stator of the first motor while the other end of the first connecting arm piece is connected to the rotor of the second motor. One end of the second connecting arm piece is connected to the stator of the second motor while the other end of the second connecting arm piece is connected to the rotor of the third motor. Especially, the outside of the first motor is provided with the first protective case and the first protective cover. Likewise, a second protective case and a second protective cover are arranged outside of the second motor. The first seal ring is set between the fastening assembly and the rotor of the first motor. The second seal ring is set between the first protective case and the first protective cover. The third seal ring sheathes the shaft of the second motor. The fourth seal ring is arranged between the second protective case and the second protective cover. The first waterproof plug is located between the first protective case and the first connecting arm piece. The second waterproof plug is set between the second protective case and the second connecting arm piece. And the third waterproof plug is arranged at one end of the shaft of the third motor and plugs the shaft socket of the third motor. The waterproof stabilizer of this invention reinforces the sealability of structural parts and connecting parts of the waterproof stabilizer, which enables the waterproof stabilizer to be waterproof and functionally applicable in dampness or when contacting water.

The above-mentioned embodiments are the preferred embodiments of the present invention. Variations and modifications are allowed within the scope of the invention. Those skilled in the art will appreciate that the features described above can be combined in various ways to form multiple variations of the invention. As a result, such variations fall within the scope of the protection to the present invention.

What is claimed is:

1. A waterproof stabilizer comprising a fastening assembly (1), a rotary assembly (2) and a waterproof assembly (3), characterized in that the rotary assembly (2) comprises a first motor (21), a second motor (22), a third motor (23), a first connecting arm piece (24) and a second connecting arm piece (25); the first motor (21), the second motor (22) and the third motor (23) are spatially distributed orthogonally; a rotor of the first motor (21) is connected to the fastening assembly (1); a stator of the first motor (21) is fixedly connected to a rotor of the second motor (22) via the first connecting arm piece (24); a stator of the second motor (22)

is fixedly connected to a rotor of the third motor (23) via the second connecting arm piece (25);

a first protective case (211) and a first protective cover (212) are arranged outside of the first motor (21), a side wall of the first protective case (211) is connected to the first connecting arm piece (24), the first protective cover (212) covers the first protective case (211); a second protective case (221) and a second protective cover (222) are arranged outside of the second motor (22), a side wall of the second protective case (221) is connected to the second connecting arm piece (25), the second protective cover (222) covers the second protective case (221);

the waterproof assembly (3) comprises a first seal ring (31), a second seal ring (32), a third seal ring (33), a fourth seal ring (34), a first waterproof plug (36), a second waterproof plug (37) and a third waterproof plug (38);

the first seal ring (31) is arranged between the fastening assembly (1) and the rotor of the first motor (21);

the second seal ring (32) is arranged between the first protective case (211) and the first protective cover (212);

the third seal ring (33) sheathes a shaft of the second motor (22);

the fourth seal ring (34) is arranged between the second protective case (221) and the second protective cover (222);

the first waterproof plug (36) is located between the side wall of the first protective case (211) and the first connecting arm piece (24);

the second waterproof plug (37) is located between the side wall of the second protective case (221) and the second connecting arm piece (25);

the third waterproof plug (38) is disposed at one end of a shaft of the third motor (23) and plugs a shaft socket of the third motor (23).

2. A waterproof stabilizer according to claim 1, characterized in that the waterproof stabilizer further comprises a base (4), a stator of the third motor (23) is attached on a top surface of the base (4); the base (4) comprises an outer case (46) and a lid (47), the lid (47) covers the outer case (46); an USB port (41) and an indicating light (42) are arranged on a surface of the outer case (46); the waterproof assembly (3) further comprises a fifth seal ring (35), a fourth waterproof plug (39), a waterproof membrane (310) and a waterproof plate (311); the fifth seal ring (35) is set between the outer case (46) and the lid (47); the fourth waterproof plug (39) is attached to the surface of the outer case (46) and fully covers the USB port (41); the waterproof membrane (310) is attached to the surface of the outer case (46) and fully covers the indicating light (42); the waterproof plate (311) is attached on a surface of the lid (47).

3. A waterproof stabilizer according to claim 2, characterized in that the first seal ring (31), the second seal ring (32), the third seal ring (33), the fourth seal ring (34) and the fifth seal ring (35) are made O-shaped.

4. A waterproof stabilizer according to claim 2, characterized in that the waterproof membrane (310) is made of transparent material.

5. A waterproof stabilizer according to claim 2, characterized in that the base (4) further comprises a control board and a button interface (43) and is provided with a mounting component.

6. A waterproof stabilizer according to claim 1, characterized in that a slideway (241) is situated at one end of the first connecting arm piece (24) that connects to the rotor of the second motor (22); the rotor of the second motor (22) is provided with a connecting piece (223), through which the rotor of the second motor (22) slides into the slideway (241) for connection; the connecting piece (223) has a fastening piece (2231) for fixing a relative position between the second motor (22) and the first connecting arm piece (24).

7. A waterproof stabilizer according to claim 6, characterized in that the fastening piece (2231) is a screw connector, which sleeves on an outside of the connecting piece (223).

8. A waterproof stabilizer according to claim 1, characterized in that the fastening assembly 1 comprises a fixing plate (11), a clamping bar (12) and a locking screw (13); an upper end and a lower end of the fixing plate (11) are arranged with a groove for holding an object; the upper end and the lower end of the fixing plate (11) are also provided with a through hole, corresponding to which a screw hole is respectively located on an upper end and a lower end of the clamping bar (12); the locking screw (13) threads its way through both the through hole and the screw hole to stabilize the object within a space confined by the fixing plate (11) and the clamping bar (12).

9. A waterproof stabilizer according to claim 8, characterized in that the through hole is provided with a slot (111) for left and right motion of the locking screw (13).

10. A waterproof stabilizer according to claim 1, characterized in that the waterproof assembly (3) is made of soft material.

11. A waterproof stabilizer according to claim 1, characterized in that the first seal ring (31), the second seal ring (32), the third seal ring (33) and the fourth seal ring (34) are made O-shaped.

* * * * *